United States Patent [19]

Hughes et al.

[11] Patent Number: 5,109,484
[45] Date of Patent: Apr. 28, 1992

[54] SELF CONFIGURING TERMINAL WHICH POLLS LOOP NETWORK AND GENERATES LIST OF CONNECTED DEVICES FOR USE IN SELECTIVELY DOWNLOADING CONTROL PROGRAMS

[75] Inventors: David R. Hughes, Raleigh; Hollis P. Posey, Cary, both of N.C.

[73] Assignee: International Business Machines Corporation, Armonk, N.Y.

[21] Appl. No.: 849,641

[22] Filed: Apr. 9, 1986

[51] Int. Cl.$^5$ .................. G06F 13/22; G06F 3/14; G06F 13/38

[52] U.S. Cl. .................. 395/200; 364/280; 364/280.2; 364/284; 364/284.4; 364/284.3; 364/286; 364/286.1; 364/259; 364/259.3; 364/260; 364/240.8; 364/240.9; 364/241.1; 364/242.94; 364/940; 364/940.1; 364/940.5; 364/937; 364/940.81; 364/DIG. 1

[58] Field of Search ... 364/200 MS File, 900 MS File; 340/825.08; 370/90, 86

[56] References Cited

U.S. PATENT DOCUMENTS

| | | | |
|---|---|---|---|
| 4,055,808 | 10/1977 | Holsinger et al. | 375/8 |
| 4,070,704 | 1/1978 | Calle et al. | 364/200 |
| 4,071,908 | 1/1978 | Brophy | 364/900 |
| 4,075,693 | 2/1978 | Fox et al. | 364/200 |
| 4,177,512 | 12/1979 | Moggia | 364/200 |
| 4,194,349 | 3/1980 | Lane | 364/470 |
| 4,195,351 | 3/1980 | Barner | 364/900 |
| 4,268,901 | 5/1981 | Subrizi et al. | 364/200 |
| 4,354,229 | 10/1982 | Davis et al. | 364/200 |
| 4,360,912 | 11/1982 | Metz | 370/90 |
| 4,403,303 | 9/1983 | Howes et al. | 364/900 |
| 4,441,160 | 4/1984 | Azcua | 364/900 |
| 4,468,750 | 8/1984 | Chamoff | 364/900 |
| 4,543,626 | 9/1985 | Bean | 364/200 |
| 4,545,013 | 10/1985 | Lyon et al. | 364/200 |
| 4,547,851 | 10/1985 | Kurland | 364/410 |
| 4,570,259 | 2/1986 | Ishii | 370/89 |
| 4,595,921 | 6/1986 | Wang et al. | 370/96 |
| 4,639,916 | 1/1987 | Boutterin et al. | 364/200 |
| 4,665,501 | 5/1987 | Saldin et al. | 364/900 |
| 4,669,044 | 5/1987 | Houser | 364/200 |
| 4,683,531 | 7/1987 | Kelch et al. | 340/825.08 |
| 4,683,563 | 7/1987 | Rouse | 370/16 |
| 4,695,946 | 9/1987 | Andreason | 364/200 |
| 4,707,825 | 11/1987 | Amstutz | 370/60 |
| 4,723,208 | 2/1988 | Chadima | 364/200 |
| 4,747,100 | 5/1988 | Roach et al. | 370/86 |
| 4,751,648 | 6/1988 | Sears, III | 364/422 |
| 4,766,590 | 8/1988 | Hamada | 370/56 |
| 4,777,330 | 10/1988 | Nakayashi | 371/11.2 |
| 4,864,492 | 9/1989 | Blakely-Fogel | 364/200 |

FOREIGN PATENT DOCUMENTS 7142052 2/1986 Japan.
8600733 7/1984 United Kingdom ............... 364/200

OTHER PUBLICATIONS

IBM Tech. Discl. Bul., vol. 28, No. 5, Oct. 1985, pp. 1920-1922.
IBM Tech. Discl. Bul., vol. 27, No. 5, Oct. 1984, p. 2853.
Patent Abstracts of Japan, vol. 7, No. 67 (p-184).

Primary Examiner—Thomas C. Lee
Assistant Examiner—Eric Coleman
Attorney, Agent, or Firm—Joscelyn G. Cockburn

[57] ABSTRACT

Apparatus and method for defining I/O devices connected to terminals of a distributive data processing system and for downloading programs from a control computer into said terminals. A global listing containing identities of all devices that can be coupled to the terminal is prepared at each terminal. A configuration list of devices which are actually coupled to the terminal is derived from the global list. The configuration list is stored at the terminal and at the control computer. Thereafter, only programs that are required for controlling the devices that are actually coupled to the terminal are downloaded into the terminal.

8 Claims, 5 Drawing Sheets

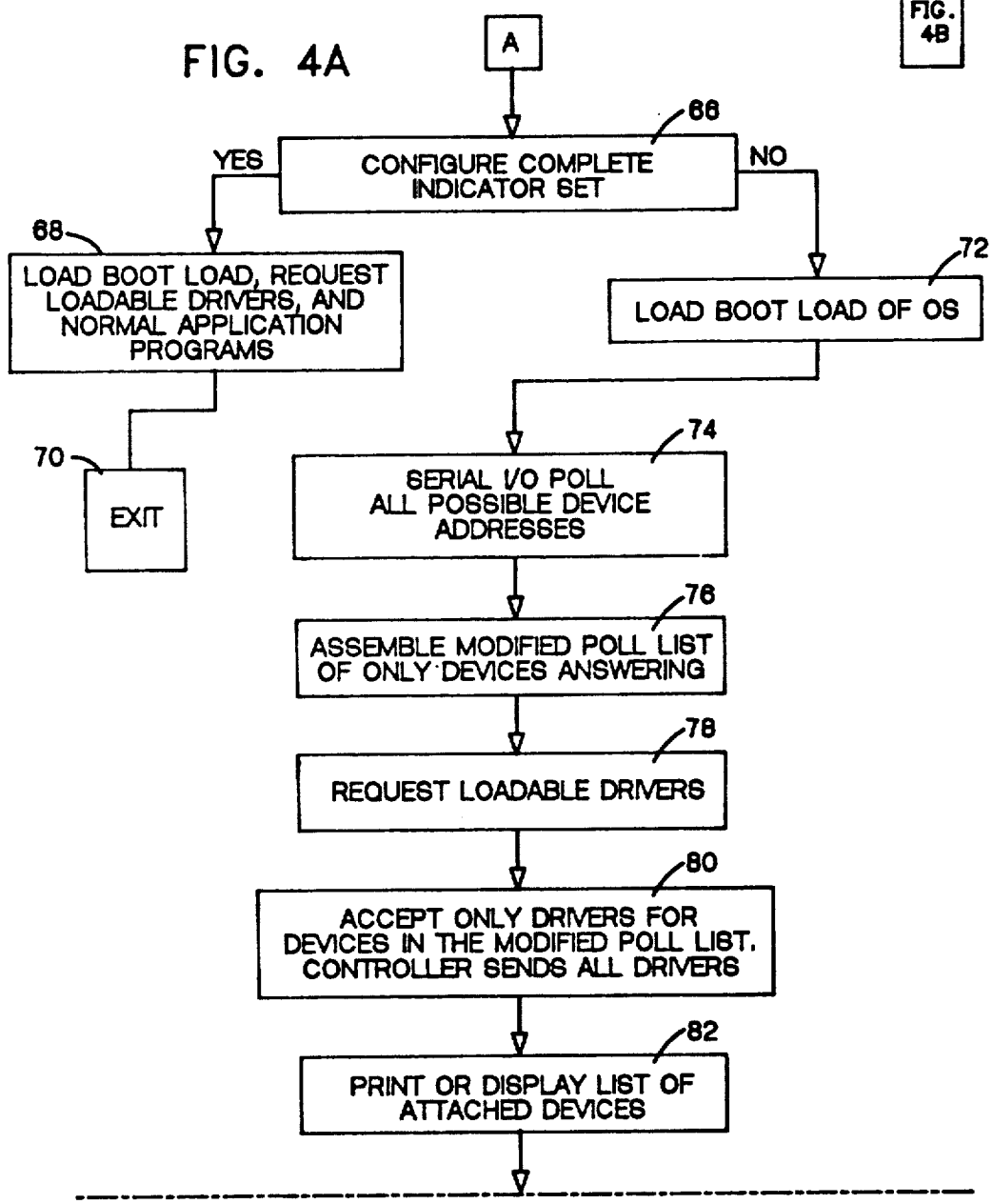

SELF CONFIGURING TERMINAL WHICH POLLS LOOP NETWORK AND GENERATES LIST OF CONNECTED DEVICES FOR USE IN SELECTIVELY DOWNLOADING CONTROL PROGRAMS

BACKGROUND OF THE INVENTION

1. Field of the Invention

The present invention relates to data processing systems in general and, more particularly, to methods for initial program loading (IPL) terminals in said data processing systems.

2. Prior Art

A typical data processing system usually includes a host computer which is coupled by a communications network to a plurality of terminals. Each terminal is connected to one or more I/O devices. Such I/O devices may include keyboards, printers, displays, etc. In order for the system to function satisfactorily, the host computer must know the system configuration. This means that the host computer must know the addresses of each terminal, controller and/or I/O devices connected to particular terminals. This information is used by the host computer to download programs into the controllers and/or the terminals. These programs provide the interface through which data can be exchanged between a terminal and an attached I/O device.

In the past, several techniques have been used to provide the host computer with information on the system configuration. In one such prior art technique the system configuration is defined manually, by an operator, at the host computer. The operator uses macro instructions to effectively build an operating system load image for each type of terminal to be loaded by the controller. The operating system is subsequently transferred to the terminals. Although the technique works well, it is time-consuming and laborious. It also requires a host computer and an experienced programmer to enter the configuration profiles.

Other techniques such as automatic address assignment of different stations of the network and entering a serial number into a remove device are set forth in U.S. Pat. Nos. 4,423,414 and 4,424,573, respectively.

SUMMARY OF THE INVENTION

It is therefore a general object of the present invention to provide a method which enables a terminal to determine its attached I/O devices and to download its operating systems for controlling operation of the terminal.

The self-configuration process is automatic and works as follows. At Initial Program Load (IPL) time a section of the operating system called "Boot Load Image" is downloaded into the terminal and prepares a poll list containing the addresses of all devices which can be attached to the terminal. The terminal then sequentially polls each device on the list. If a device is attached, it will respond with a message which indicates its presence. Devices that are not attached will not respond. Non-responding devices are striken from the list. Thus, a new poll list containing only addresses of attached (i.e., responding) devices is now available at the terminal).

Thereafter, a controller transmits, to all terminals attached to it, programming support for all possible devices (e.g., keyboard scanner, display, etc.) However, each terminal will only load those programs which are required to support its attached devices. Following the loading routine, the terminal will display or print a list of all attached devices and prompts an operator to verify that the list is correct. At this point the operator may notify (via an input sequence) the terminal that the listing is correct or modify the listing by adding and/or deleting devices. The verified configuration is stored at each terminal and an indicator that the terminal is configured is set. The configuration can also be transmitted to the controller and/or host computer for subsequent use. Thereafter, on each subsequent IPL, the terminal will select only the operator-approved program support which is required to control its attached devices. In one feature of the invention the "Boot Load Image" prepares a list of only a subset of all the possible devices that can be attached to the terminal. Preferably, the list contains the addresses of essential devices such as keyboards, printers, etc.

BRIEF DESCRIPTION OF THE DRAWINGS

FIGS. 4A and 4B show flow charts of the process which allows a terminal to self-configure.

DESCRIPTION OF THE PREFERRED EMBODIMENT

The present invention to be described hereinafter can be used to configure any data processing system. It works well with a point of sale data processing system and, as such, will be described in that environment. However, this should not be construed as a limitation on the scope of the present invention since it is well within the skills of one skilled in the art to make minor changes and adapt the teaching of the present invention to configure other types of data processing systems.

Figure 1:
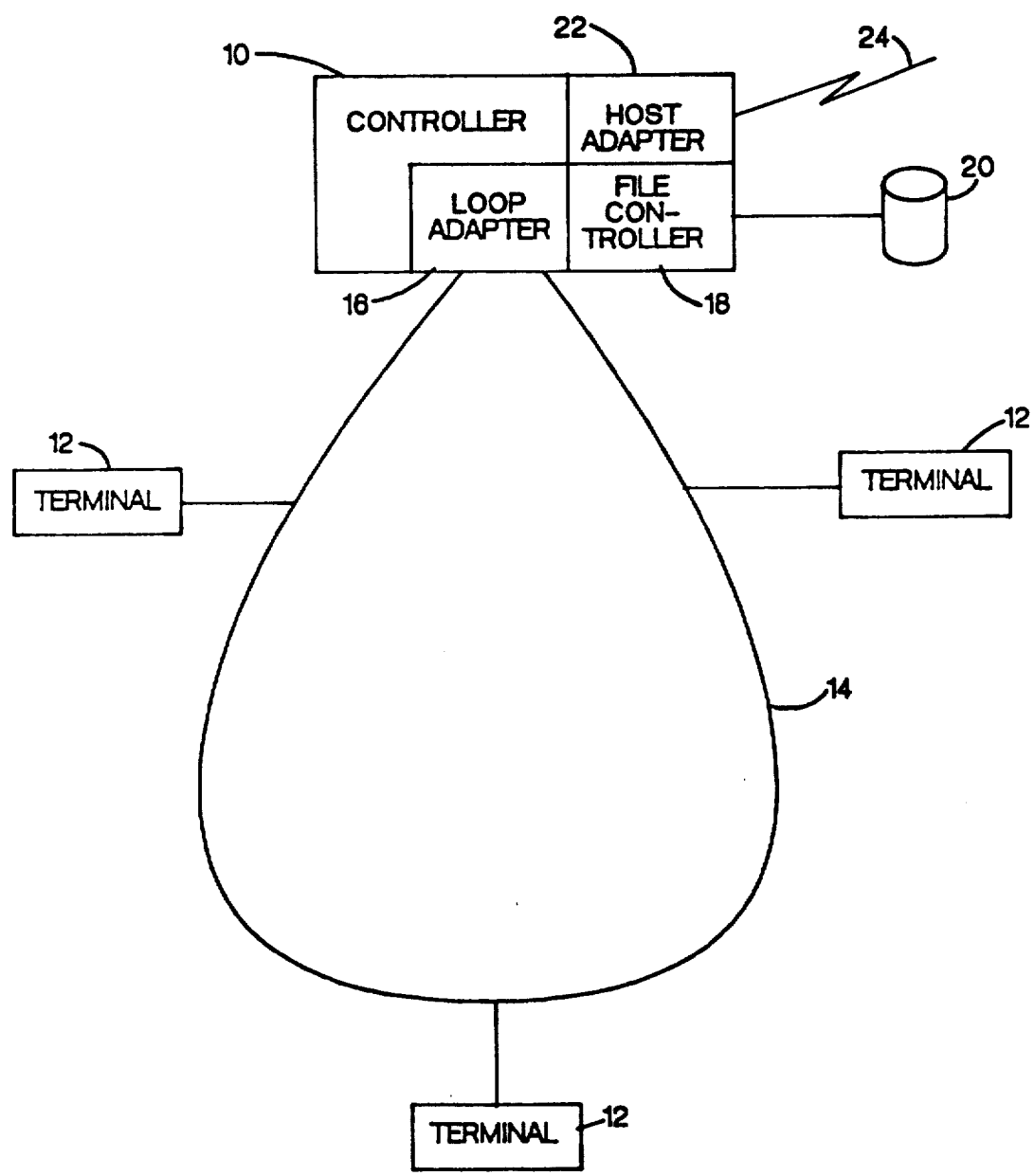
FIG. 1 shows a schematic for a point of sale data processing system.

FIG. 1 shows a schematic of a point of sale data processing system. The data processing system includes a controller identified by numeral 10. Although any type of conventional computer can be used as the controller, in the preferred embodiment of this invention the controller is an IBM PC/AT. The PC/AT is a well-known computer and details will not be given. Suffice it to say the controller supplies disk services and host communications access to a plurality of terminals 12. The terminals are coupled through loop communications network 14 and loop adapter 16 to controller 10. File controller 18 interconnects controller 10 to a file facility identified by numeral 20. Data which is stored on the file facility 20 can be brought into controller 10 whenever it is needed. Host adapter 22 and communications link 24 interconnects controller 10 to a host computer (not shown).

Both controller 10 and terminals 12 are controlled by programs stored in their respective RAMs. Because the RAMs are volatile, the programs are permanently stored on a disk 20 in the controller. The controller acquires its program to operate by transferring it from the disk to its RAM. Likewise, the terminals acquire their operating programs from the controller over loop communications network 14.

In order to acquire their respective operating programs, each terminal performs a configuration routine in which it determines the I/O devices which are attached to it and downloads the appropriate programs for running (that is, operating the terminal). The controller 10 uses the well-known SDLC message format for communicating with the terminal. The SDLC message format is well known and as such, details will not be given in this application. However, if one is not familiar with the SDLC message format, an example of the well-known format can be found in U.S. Pat. No. 3,872,430. The program which is downloaded into the terminals is comprised of three distinctive load segments. The load segments include an operating system boot load which is common to every terminal and provides the terminal with the capability to load further unique code from the controller; loadable drivers which are modules of code which control specific devices such as keyboards, displays, printers, etc. and application program which determines the operation of the terminal as it proceeds through each transaction.

Figure 2:
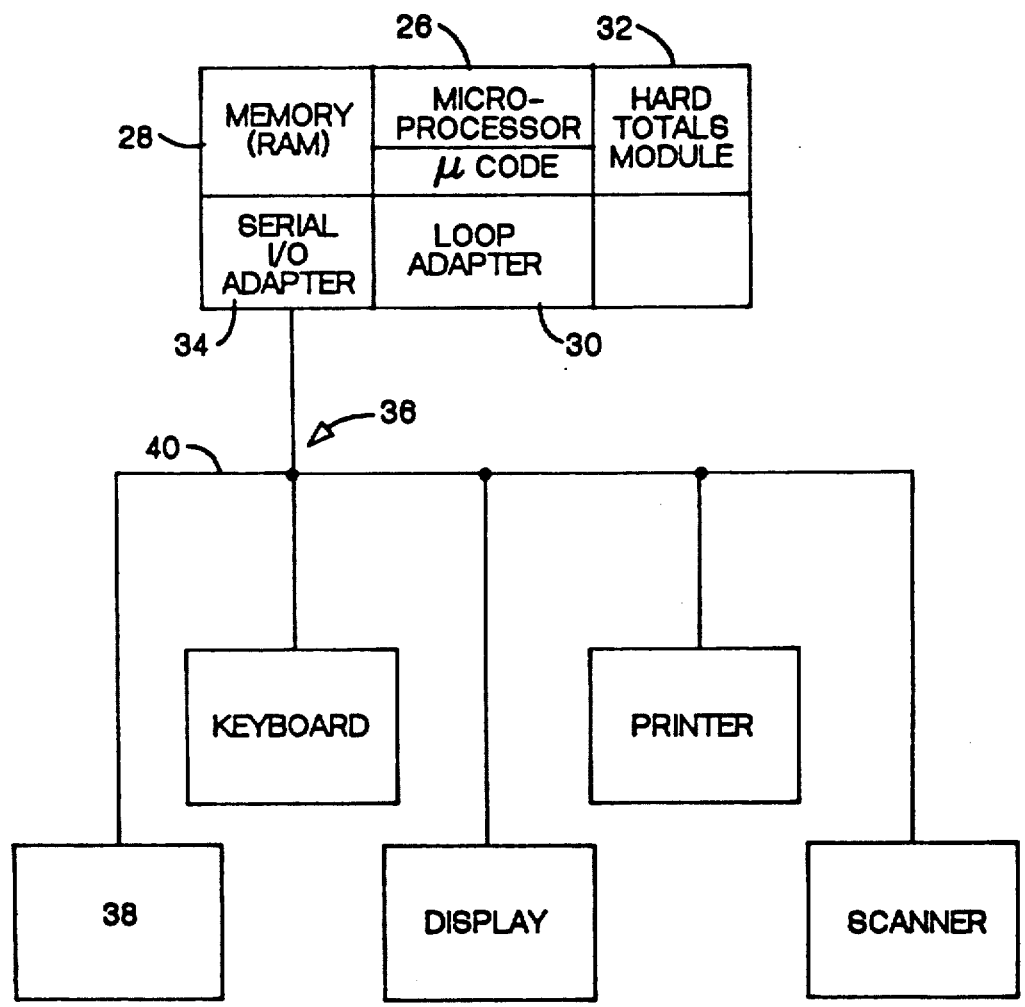
FIG. 2 shows a hardware configuration of a terminal connected to the system of FIG. 1.

FIG. 2 shows a terminal hardware configuration. The configuration includes microprocessor 26 which processes the program and controls the terminal operation. RAM 28 is coupled to the microprocessor and stores the programs for execution and data. Loop adapter 30 interfaces the terminal with loop communications network 14 (FIG. 1). It provides the communication path between the terminal and the controller. Hard totals module 32 is a battery-powered RAM and is able to store data whenever power to the terminal is disconnected. Microprocessor 26 writes information into the hard totals module. Serial I/O channel adapter 34 interconnects the serial I/O channel 36 to the terminal. The serial I/O channel is a multi-point communications link and provides a communication path between the terminal and its attached devices. The attached I/O devices may include keyboards, displays, printers, scanners, etc. A satellite terminal identified by numeral 38 is coupled over conductor 40 to serial I/O channel 36. Although not shown in FIG. 2, a set of I/O devices similar to those connected to serial I/O channel 36 are also connected to satellite terminal 38. A sub-set of the SDLC protocol is used for communicating over serial I/O channel 36. The protocol is described in a patent application entitled, "Method and Apparatus for Communicating with Remote Units in a Distributive Data Processing System."

In order to operate a terminal, the terminal must know the I/O devices that are connected to it and obtain programs from the controller to control these devices. Thus, the present invention is concerned with a technique that allows a terminal to determine the I/O devices that are connected to it and downloads the appropriate programs into its RAM. This procedure is referred to herein as "terminal configuration." It should be noted that the output of the routine as transmitted to the controller or host can also be used to determine the identity of any terminal and its I/O attachments within the entire computing network. Before detailing the configuration routine, a summary description of the program structure in the terminal and I/O devices is in order.

Figure 3:
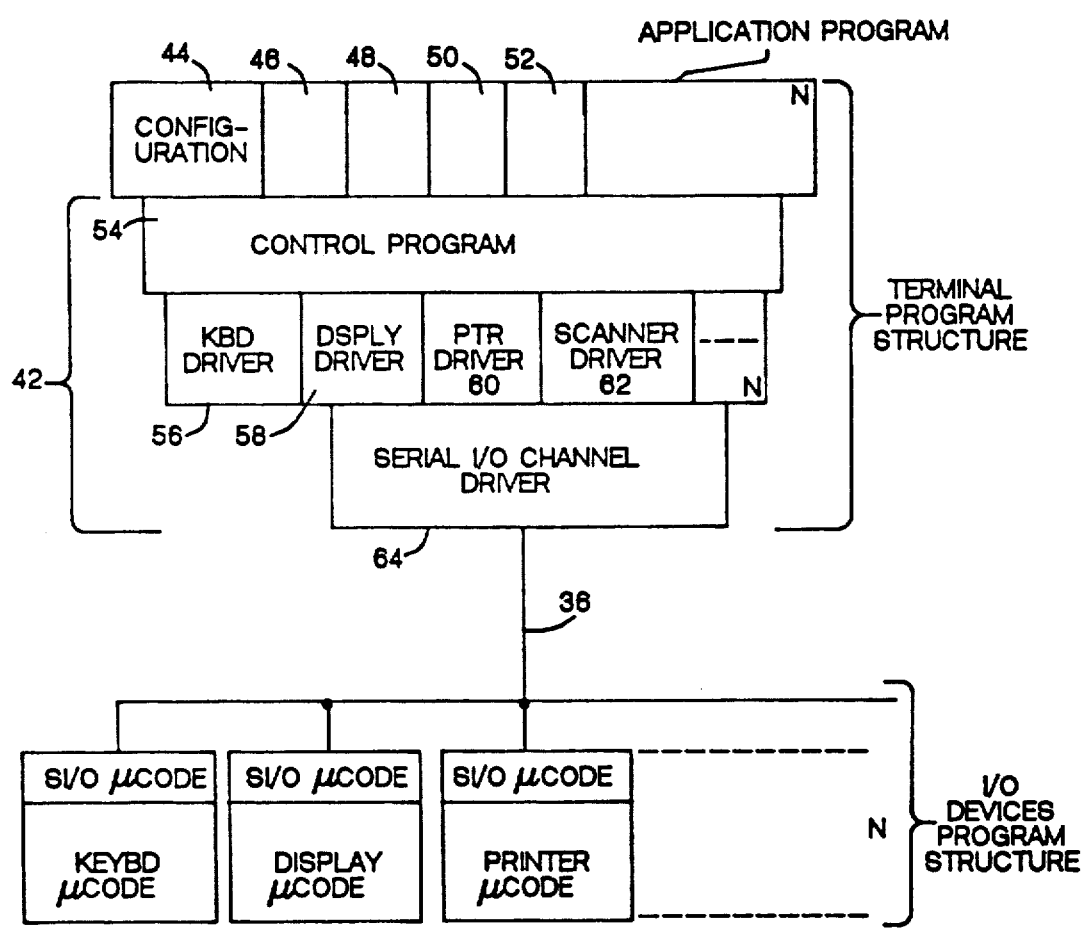
FIG. 3 is a conceptual representation of a program structure for the terminal in FIG. 2.

FIG. 3 shows a conceptual schematic of the program structure in the terminal and I/O devices, respectively. The terminal program includes operating system 42 and a plurality of application programs 44 through N disposed on top of the operating system. As is evident from the schematic, several application programs can coexist in the terminal, each one being dedicated for performing a special function. Thus, one application program may be used for controlling cash sales. Another can be used for controlling layaways and so forth. Among the application programs is configuration program 44. Functional details of this program will be given subsequently. Suffice it to say that this application program is used for configuring the terminal. Control program 54 controls the interaction between the application programs and device drivers 56-N. The device drivers (sometimes called "access method") are modules of code which control particular devices. Thus, keyboard driver 56 (KBD) controls the keyboard, display (DSPLY) driver 58 controls the display and so forth. Serial I/O channel driver 64 is the access method for the serial I/O channel 36. The serial I/O channel driver receives messages from the attached devices and passes them on to their associated drivers. Similarly, it also accepts messages from the drivers and delivers these messages to the associated device. Since the serial I/O channel 36 is a multi-point communication channel, a polling routine is used for communicating with the I/O devices and the terminal.

Still referring to FIG. 3, the program structure for each I/O device includes a serial I/O microcode (SI/OU Code) and a device microcode. The serial I/O microcode interfaces each device with serial I/O channel 36. The serial I/O microcode allows the transmission of messages from the device to its driver and receives messages at the device form its associated driver. The device microcode (one for each device) controls the actions of the device in response to commands contained in the device's received messages.

As is evident from FIG. 3, many different types of devices may be attached to a terminal. In fact, multiples of the same device may also be attached to a terminal (example, two displays). To communicate with these devices, each device is uniquely identified by its serial I/O channel address. This address is the first character of all messages that are transferred on the serial I/O channel 36. Messages are solicited over serial I/O channel 36 from the device by polling the device with its address. A device seeing its address in the message will forward data if it has any to be transmitted or respond with an end of poll (EOP) message.

Having described the configuration of the terminal, the procedure which is provided for a terminal to automatically configure itself will now be described. The procedure is as follows:

At IPL time the bring-up code in the terminal ROS receives and loads the boot load portion of the operating system. The boot load portion is transmitted from the controller via the store loop.

The serial I/O channel driver in the boot load then constructs a poll list comprising of all possible device addresses which can be connected to the terminal and starts the polling of each address.

If a device does not respond to a poll after it has been polled a specified number of times (say 16), a timer condition is posted by the driver and the device address is removed from the poll list.

When the driver no longer receives any poll timeouts and all polled devices are responding, the drive stores the modified poll lists and requests the loadable driver portion of the operating system load from the controller.

The controller then transmits all the device drivers on the loop.

The terminal receives each driver transmitted and checks this driver against the addresses contained in the modified poll list.

If a match is found between the received driver and an address in the modified poll list, a terminal accepts the driver and installs it into its operating system.

If a match is not found, the terminal discards the driver.

This process continues until the terminal has loaded a driver for every address in the modified poll list. The station now has its operating system loaded and requests the configuration application load from the controller. With the configuration application program being loaded, the list of devices which are attached to the terminal is displayed and/or printed. The program, via the display, then prompts the operator for a terminal address and gives him an opportunity to verify the list by keying a specified key sequence into the terminal. At this time the operator may also key in changes to the list adding or deleting devices. The operator may also enter the name or other identifier of the normal application programs which should be loaded.

Once the operator keys in verification of the configuration, the configuration is stored in the hard totals module of the terminal and is transmitted to the controller where it is stored on the disk.

The terminal also sets the indicator in the control section of the hard totals module to signify that configuration has taken place and does not need to be run again.

The procedure also includes a RAS routine wherein the terminal now resets itself and requests a complete program load from the controller. This time when the controller transmits its load and thereafter the controller sends only the load modules required by the terminal when requested. The application programs now loaded are the applications that the terminal normally runs rather than the configuration application. If the operator in the future wishes to add or remove devices from the terminal, a key sequence entered by the operator causes the terminal to request a load of the configuration application from the controller, and the above described routine is repeated, including the setting of the new configuration data in the hard totals module and the writing of this new data on the controller disk.

Figure 4B:
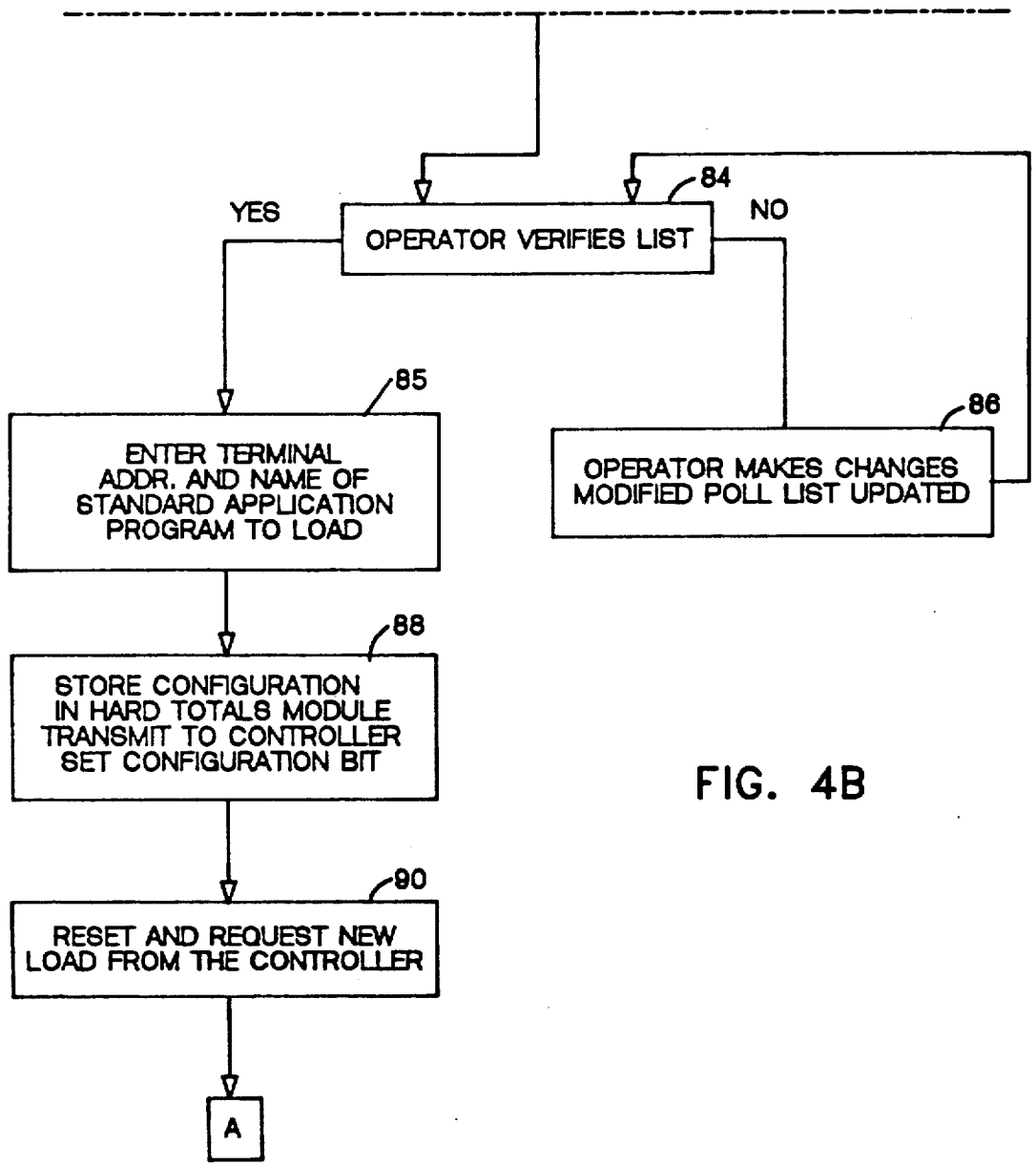

FIGS. 4A and 4B show configuration flow charts for the above-described procedure. Block A is an entry block signifying the point whereat the program enters the routine. From Block A the program descends into block 66. In block 66 the program checks to see if the configuration complete bit is set. As stated above, this is an indicator in the control section of the hard totals module. If the bit is set, the program descends into block 68 where it loads the load boot load section of the operating system, requests the loadable drivers and normal application programs (PGMS) and exits the routine through block 70.

If the configuration indicator was not set, that is, in an "off" state, the program then descends into block 72. In block 72, the load boot load segment of the operating system (OS) is loaded and the program descends into block 74. In block 74 the serial I/O polls all possible device addresses. In block 76 the program forms a modified poll list of only devices answering to a poll. The program then descends into block 78 where it requests loadable drivers from the controller. The program then descends into block 80 where it accepts only drivers for devices in the modified poll lists. The program then descends into block 82 where it prints or displays a listing of attached devices. The program then descends into block 84. In block 84 an operator verifies the display list. If the list is unsatisfactory, the program descends into block 86 where the operator makes changes to modify the poll list and loops into block 84 for verification. Once the list is verified, the program then descends into block 85 where it performs the functions container therein and descends into block 88 where the verified configuration is stored in the hard totals module and is transmitted to the controller. The program also sets the configuration indicator. The program then descends into block 90 where it resets the terminal which causes execution to begin at Block A (FIG. 4A).

Several benefits inure to a user of the present invention. Among the benefits are the following:

The manual definition of generic terminal types through selection of component parts in a separate step is not necessary.

A disk space for generic load images is not required.

The terminal RAM is loaded only for the devices actually attached.

Each terminal is set up only once and retains its configuration until instructed to change. This step is performed as part of the initial terminal installation and hardware verification.

All terminals requiring the same load element receive it simultaneously, thereby reducing loop transmission time.

A variety of I/O gear can be supported throughout the product life without major network since a system unit can receive a RAM load without operator input. This initial RAM load can carry knowledge of newly available I/O units which have been attached to the system unit.

Another benefit is that a terminal can be loaded without knowing the address.

While the invention has been particularly shown and described with reference to the preferred embodiments thereof, it will be understood by those skilled in the art that various changes in form and details may be made therein without departing from the spirit and scope of the invention.

Having thus described our invention, what we claim and desired to secure as Letters Patent is as follows:

1. In a distributive data processing system wherein a computer with an operating system having a boot load module is coupled through a loop communications network to a plurality of terminals and each terminal is connected by a serial channel to a plurality of I/O devices a method for providing an operating system within each terminal comprising the steps of:

(a) generating, at each terminal, with the boot load module a first list including identifying indicia for all devices that can be coupled to the terminal;

(b) transmitting a status message from the terminal to each of the devices recorded in said list;

(c) transmitting a response message to the terminal from a device that is active in response to receiving the status message;

(d) generating in said terminal a second list including the identifying indicia of only those devices that have responded to the status message;

(e) providing in said computer a plurality of program support modules, with each module including support programs that control a particular I/O device and indicia identifying the particular I/O device that it controls;

(f) transmitting from the computer to the loop communications network the plurality of program support modules;

(g) receiving and loading in the memory of said terminal only the program support modules whose identifying indicia matches identifying indicia in the second list.

2. In a distributive data processing system wherein a computer, having an operating system with a boot load driver module, is coupled through a loop communications network to a plurality of terminals and each terminal is connected by a serial channel to a plurality of I/O devices a method for providing an operating system within each terminal comprising the steps of:

(a) using the boot load driver module for generating at each terminal a first list including identifying indicia for all devices that can be coupled to the terminal;

(b) transmitting a status message from the terminal to each of the devices recorded in said list;

(c) transmitting a response message to the terminal from a device that is active in response to receiving the status message;

(d) generating in said terminal a second list including the identifying indicia of only those devices that have responded to the status message;

(e) providing in said computer a plurality of program support modules, with each module including support programs that control a particular I/O device and indicia identifying the particular I/O device that it controls;

(f) transmitting from the computer to the loop communications network the plurality of program support modules;

(g) receiving and loading in the memory of said terminal only the program support modules whose identifying indicia matches identifying indicia in the second list;

(h) displaying, to a user, a visual listing of devices which are connected to the terminal;

prompting the user to adjust and verify the correctness of the visually displayed list; and storing at each terminal a copy of a verified list of devices that are connected to the terminal.

3. The method of claim 2 further including the steps of transmitting the verified list to the computer; and setting an indicator in said terminal thereby signifying that the operating system is loaded.

4. The method of claim 1 further including the steps of electronically erasing stored program support modules in the terminal;

requesting a complete program load from the computer; and receiving and loading in the terminal only the program support modules that control active devices connected to said terminal.

5. A method for providing operating systems to processors of a data processing system comprising the steps of:

(a) arranging a hierarchical structure having a control processor with an operating system which includes a boot load module coupled by a loop communications network to a plurality of second order processors and each second order processor coupled through a second communications network to a plurality of third order processors with each third order processor designated to control an I/O device;

(b) generating, at each second order processor, with the boot load module a first list including an identifying indicia of all possible third order processors that can be connected to said each second order processor;

(c) transmitting a first message including the identifying indicia from said each second order processor to all third order processors recorded in said list;

(d) receiving and copying, at each attached third order processor, said message only if the identifying indicia matches that of the third order processor;

(e) transmitting to the second order processor a response message from each active third order processor whose identifying indicia was in the first message;

(f) generating, at each said second order processor, a second list including the identifying indicia of only the third order processors responding to the first message;

(g) issuing from each said second order processor to the control processor a message requesting said control processor to download program support modules, and (h) loading, at each second order processor only those program support modules whose identifying indicia are recorded in the second list.

6. The method set forth in claim 5 wherein the identifying indicia includes an address for each third order processor.

7. In a data processing system arranged in a hierarchical structure with a control processor having an operating system with at least one boot load driver module coupled by a loop communications network to a plurality of second order processors and each second order processor coupled through a serial communications network to a plurality of third order processors with each third order processor designated to control an I/O device a method for providing an operating system in each second order processor comprising the steps of:

generating, at each second order processor, with the boot load driver module a first list including an address for each of all possible third order processors that can be connected to said second order processor;

transmitting a first message including the address from said each second order processor to all third order processors recorded in said list;

receiving and copying, at each third order processor, said message only if the address matches that of the third order processor;

transmitting to the second order processor a response message from each third order processor whose address was in the first message;

generating, at each said second order processor, a second list including addresses of only the third order processors responding to the first message;

requesting program support modules from the control processor;

loading, at each second order processor, only those programs which are required to control the attached third order processor;

displaying to a user a configuration table that includes said second list;

prompting the user to verify the configuration table;

storing a copy of a verified configuration table;

utilizing said verified configuration table for loading said second order processor; and thereafter polling only third order processors whose addresses appear in the second list.

8. In a data processing system having a control processor, with an operating system which includes a boot load module, coupled by a looped communications network to a plurality of second order processors and each second order processor coupled through a serial communications network to a plurality of third order processors which control I/O devices a device for providing an operating system within a second order processor comprising:

means, including the boot load module, for generating at each second order processor, a first list including an identity indicia of all possible third order processors that can be connected to said each second order processor;

means for transmitting a first message including the identity indicia from said each second order processor to all third order processors recorded in said list;

means for receiving and copying, at each attached third order processor, said message if the identity indicia matches that of the third order processor;

means, at each third order processor, for transmitting a response message to said second order processor;

means for generating, at each said second order processor, a second list including the identity indicia of only the third order processors responding to the first message;

means, at the control processor, for transmitting modules including identifying indicia for controlling the third order processor; and means at the second order processor for receiving the modules and for correlating the identifying indicia on each module with the identifying indicia of each entry in the second list and loading only modules whose identifying indicia matches an identifying indicia in said second list.

* * * * *